(12) United States Patent
Zhou

(10) Patent No.: US 7,668,347 B2
(45) Date of Patent: Feb. 23, 2010

(54) DIGITAL WATERMARKING OF PICTURE IDENTITY DOCUMENTS USING EIGENFACE VECTORS OF EIGENFACE FACIAL FEATURES OF THE DOCUMENT FACIAL IMAGE AS THE WATERMARK KEY

(75) Inventor: Wensheng Zhou, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 511 days.

(21) Appl. No.: 11/278,987

(22) Filed: Apr. 7, 2006

(65) Prior Publication Data

US 2007/0237354 A1  Oct. 11, 2007

(51) Int. Cl.
G06K 9/00 (2006.01)
(52) U.S. Cl. ...................... 382/118; 382/100
(58) Field of Classification Search ................. 382/118, 382/115
See application file for complete search history.

(56) References Cited

U.S. PATENT DOCUMENTS 7,424,131 B2 * 9/2008 Alattar et al. ............... 382/100

OTHER PUBLICATIONS

Moon et al., Performance evaluation of watermarking techniques for secure multimodal biometric systems, Computer Intelligence and Security, Springer Berlin/Heidelberg, vol. 3802/2005, pp. 635-642.*
Li et al., When eigenfaces are combined with wavelets, Knowledge based systems, vol. 15, 2002, pp. 343-347.*
Rey et al., Blind detection of malicious alterations on still images using robust watermarks, in IEE Seminar: Secure Images and Image Authentication, 2000.*
Jain et al., Hiding biometric data, IEEE Transactions on pattern analysis and machine intelligence, vol. 25, No. 11, Nov. 2003, pp. 1494-1498.*
Zhong et al., Facial features detection by coefficients distribution map, Springer Berlin/Heidelberg, vol. 3691/2005, pp. 822-828.*
Moon et al.; Performance Evaluation of Watermarking Techniques for Secure Multimodal Biometric Systems, Computational Intelligence and Security: International Conference, CIS 2005, Xi'an, China, Dec. 15-19, 2005, p. 635-642.*
Xie et al.; Joint Wavelet Compression and Authentication Watermarking, In Proceedings of the 5th IEEE International Conference on Image Processing, 1998, p. 427-431.*
Jain et al.; Hiding Biometric Data, IEEE Transactions on Pattern Analysis and Machine Intelligence, vol. 25, No. 11, Nov. 2003, p. 1494-1498.*

(Continued)

*Primary Examiner*—Bhavesh M Mehta
*Assistant Examiner*—Thomas A Conway
(74) *Attorney, Agent, or Firm*—Brosemer, Kolefas & Associates

(57) ABSTRACT

An improved method of watermarking picture identification documents (IDs) such as passports, driver's licenses, identification cards and the like which combines biometric information with digital watermarking to provide an improved secure picture ID document and authentication of same. A facial image—that is part of the identification document—is processed such that particular facial features are extracted from the overall facial image. The extracted features are used to generate a watermark key that is subsequently used to embed a unique watermark into the facial image or other location on the identification document.

24 Claims, 6 Drawing Sheets

OTHER PUBLICATIONS

Rey et al.; Blind Detection of Malicious Alterations on Still Images Using Robust Watermarks, in IEE Seminar: Secure Images and Image Authentication, 2000, pp. 7/1-7/6.*

Li et al.; When Eigenfaces are Combined with Wavelets, Knowledge Based Systems, vol. 15, 2002, p. 343, section 2.*

A Digital Watermarking Scheme for Personal Image Authentication Using Eigenface; C.H. Chen and L.W.Chang; PCM 2004; LNCS 3333, pp. 410-417; 2004.

Face Recognition Using Eigenfaces; M.A.Turk, and A.P.Pentland; Proceedings of the IEEE Computer Society Conference on Computer Vision and Pattern Recognition; Jun. 1991.

Joint Wavelet Compression and Authentication Using Watermarking; L.Xie, and G.R.Arce; IEEE International Conference on Image Processing; Chicago, Ill, Oct. 1998.

The CSU Face Identification Evaluation System: Its Purpose, Features, and Structure; D. Bolme, J.Ross Beveridge, M.Teixeira, and B.Draper; International Conference on Vision Systems; Apr. 2003.

A Class of Authentication Digital Watermarks for Secure Multimedia Communication; L.Xie, G.R.Arce; IEEE Transactions on Image Processing; Nov. 2001.

* cited by examiner $V = [v_0, v_1, \ldots, v_N]$ $v_i = \langle I, e_i \rangle$ $E = [e_0, e_1, \ldots, e_N]$ Eigen Faces

↑ PCA ANALYSIS

Training Images

DIGITAL WATERMARKING OF PICTURE IDENTITY DOCUMENTS USING EIGENFACE VECTORS OF EIGENFACE FACIAL FEATURES OF THE DOCUMENT FACIAL IMAGE AS THE WATERMARK KEY

FIELD OF THE INVENTION

This invention relates generally to the field of personal identification and in particular to a picture identification apparatus and method which employs digital watermarking of facial features.

BACKGROUND OF THE INVENTION

The threat of forgery of identity documents is growing at an astounding rate. In the past, only skilled professionals with sophisticated equipment were capable of counterfeiting passports, driver's licenses, identification cards and financial instruments. Today however, the counterfeiting threat for this wide array identity documents has moved from the professional counterfeiter to the amateur. Sophisticated counterfeiting tools such as scanners, card printers, and image editing software are readily available, and identity document attacks by both criminal and casual counterfeiters are a growing threat.

For government-issued citizen identity documents, this counterfeiting and forgery threatens personal, corporate and national security. Reliably confirming the authenticity of an identity document is therefore of critical importance.

In recognition of this, a number of states have adopted digital watermarks—covert digital security features—that transform multiple, previously passive elements of driver licenses, such as photo and artwork, into machine-readable elements. (See, e.g., Digimarc Corporation, *Are Your IDs Secure Enough?*, February 2005, www.digimarc.com/docs)

A digital watermark enhances the security of identity documents by embedding virtually imperceptible digital information within each document. It can, for example, confirm the date of birth on a driver's license; identify an altered passport; or verify the authenticity of a security badge. When applied as a covert layer of security to identity documents such as driver licenses, digital watermarks enable machine-readable authentication of identification documents.

SUMMARY OF THE INVENTION

In accordance with the principles of the present invention—an improved method of watermarking picture identification documents (IDs) such as passports, driver's licenses, identification cards and the like is presented. Advantageously, the present invention combines biometric information with digital watermarking to provide an improved secure picture ID document and authentication of same.

According to the principles of the present invention, a facial image—that is part of the identification document—is processed such that particular facial features are extracted from the overall facial image. The extracted features are used to generate a watermark key that is subsequently used to embed a unique watermark into the facial image or other location on the identification document.

Advantageously, and in sharp contrast to the prior art, the present invention generates and embeds a watermark that is specific to a particular facial image. As a result, one embodiment of the present invention provides a mechanism by which the identification document is self-authenticating.

According to an aspect of the invention, Eigen vectors—generated from original facial images on the identification document—are used as a watermark key for the particular identification document containing the facial image. The watermark key so generated into a wavelet transformed facial image through the use of a joint wavelet compression and authentication watermark.

As a result—in a preferred embodiment, the present invention provides solutions to two major challenges to authentication watermarks namely, extractable, short, invariant and robust information that replaces fragile hash functions of the prior art and the ability to embed information that survives quantization-based lossy compression.

Additionally, watermarks applied according one embodiment of the present invention may be advantageously embedded at the same time the identification document is created or electronically distributed.

Lastly, authentication watermarks applied according to one embodiment of the present invention not only serve to authenticate the identity document and verify the face image(s), but also serve as recovery bits for recovering face values in corrupted identification documents.

These and other features and advantages of the present invention will become apparent with reference to the attached drawing and detailed description.

BRIEF DESCRIPTION OF THE DRAWING

A more complete understanding of the present invention may be realized by reference to the accompanying drawing in which.

DETAILED DESCRIPTION

Figure 1:
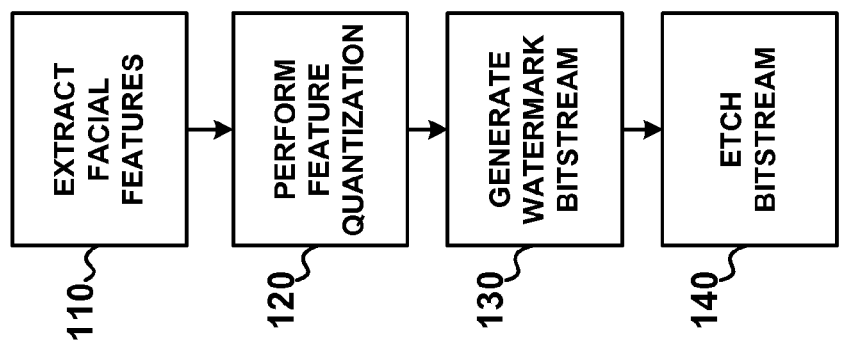
FIG. 1 is a flowchart showing the steps associated with applying a digital watermark to an ID document according to a preferred embodiment of the present invention.

FIG. 1 is a flowchart showing particular steps associated with a preferred embodiment of the present invention of embedding a watermark into an identification document. With reference to that FIG. 1, facial features are first extracted from a facial image from, for example, an image contained on a picture identification card (Block 110). The extracted features are subsequently quantized (Block 120), and from these quantized features a watermark bitstream is generated (Block 130). Finally, the generated bitstream is "etched", into a low frequency band of a wavelet image representation.

As can be appreciated by those skilled in the art, the particular watermark generated is dependent upon the particular facial features exhibited by the facial image. More specifically, the extracted facial features are used to generate watermark keys unique to the extracted features. As a result, the facial image that is part of a picture identification card advantageously self-authenticates a watermark imposed on the identification card. In this manner, the present invention provides an authentication watermark having a secret key that is unique and invariant for each particular facial image.

Figure 2:
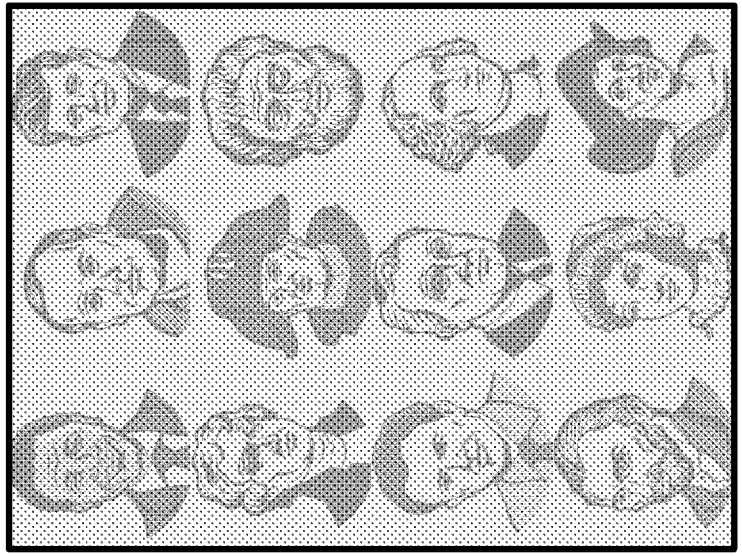
FIG. 2 shows facial feature extraction using Eigenfaces according to an embodiment of the present invention.
Figure 2:
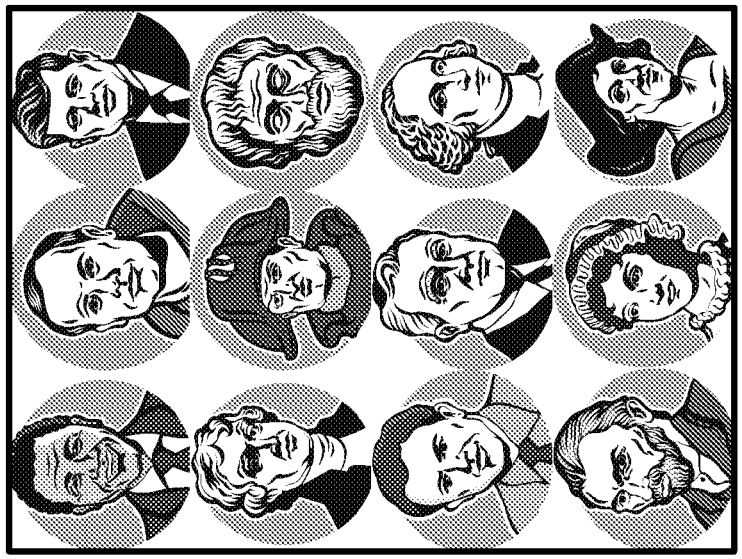

FIG. 2 shows the relationship between training facial images that are transformed into Eigenfaces as a result of Principle Component Analysis (PCA). Eigenfaces is a well-known principal component analysis based racial recognition technique the details of which were described in a paper authored by M. Turk and A. Pentland entitled "Face Recognition Using Eigenfaces", which appeared in *Proceedings of the IEEE Computer Society Conference on Computer Vision and Pattern Recognition (CVPR)*, at pages 586-591 in June 1991.

Although the mathematical underpinnings of Eigenfaces are complex, the entire algorithm is relatively simple and advantageously has a structure which is amenable to streaming. In particular, training images are represented as a set of flattened vectors and assembled together into a single matrix. The Eigen vectors of the matrix are then extracted and stored in a database.

The training face images are projected onto a feature space, appropriately called face space, defined by the Eigen vectors. This captures the variation between the set of faces without emphasis on any one facial region like the eyes or nose. The projected face space representation of each training image is also saved to a database.

To identify a face, the test image is projected to face space using the saved Eigen vectors. The projected test image is then compared against each saved projected training image to determine similarity. The identity of the person depicted in the test image is assumed to be the same as the person depicted in the training image that is determined to be most similar.

For our purposes, the procedure that defines the face space is represented by:

FUNCTION 1: Create_Eigen_Matrix(ImageList IL, int N, int M)

where ImageList IL is a set of N training images, each one having W×H (W: width, H: height) pixels and M is the number of Eigen vectors that need to be generated. The particular procedure proceeds as follows.

[1] Flatten each image into a WH element by concatenating all of the rows. Let ImageMatrix be the N×WH matrix containing all of the flattened images.

[2] Sum all of the rows of ImageMatrix and divide by N to produce an average flattened image. This WH element vector is represented by $\psi$.

[3] Subtract the average image $\psi$ from the flattened image in ImageMatrix. Let the new N×WH matrix be represented by $\phi$.

[4] Compute dot products of all possible image pairs. Let L be the new N×N matrix where L[i][j]=dot product of $\phi$[i] and $\phi$[j].

[5] Compute the N Eigen values and corresponding Eigen vectors of L. Pick M Eigen vectors corresponding to the highest Eigen values. Each Eigen vector is N elements long.

[6] Perform a matrix multiplication of each of the selected M Eigen vectors against $\phi$ and save the resulting set of 1×WH-sized matrices as a combined M×WH element EigenMatrix in a database. Also, save the average image $\psi$ as well.

We now turn to the face space projection function:
FUNCTION 2: Project_to_FaceSPACE(ImageI).

Where Image I is W×H pixels in size.

[1] We let img be the flattened WH element form of Image.
[2] Load the average image $\psi$ and the EigenMatrix from the database.
[3] Subtract the average image $\psi$ from img to create a new image, img'.
[4] Take the dot product of img' against each row of EigenMatrix thereby obtaining an M element vector img".
[5] Let:

$$norm = \sqrt{\sum_{i=1}^{M} img^k[i] \times img''[i]}.$$

[6] Divide each element of img" by norm. This is the face space representation of Image
[7] Perform a matrix multiplication of each of the selected M Eigen vectors against $\phi$ and save the resulting set of 1×WH-sized matrices as a combined M×WH element EigenMatrix in a database. Also, save the average image $\psi$ as well.

We now note that learning is a matter of projecting all known faces to the face space and saving the projected representations of each person. Accordingly:

FUNCTION 3: Generate_Eigen_Faces(ImageList IL, int N, int M)

Where ImageList IL is a set of N training images where each image is W×H pixels. A person's name is attached to each image and M is the number of Eigen vectors needed. Consequently, our procedure proceeds as follows:

[1] Call Create_Eigen_Matrix (ImageList IL, int N, int M)
[2] For each image in ImageList IL, call Project_to_FaceSPACE(Image I), and save the resulting faces in a database.

Facial identification then, is a simple matter of projecting the test image to face space and computing a similarity score. Accordingly:

FUNCTION 4: Generate_Eigen_Vector(Image $I_n$)

Where Image $I_n$ is W×H pixels in size. Our Generate_Eigen_Vector (Image $I_n$) procedure is to find the eigen vectors of the Image $I_n$:

[1] Load the saved, known projected faces from the database;
[2] proj=Project_to_FaceSPACE(Image $I_n$);
[3] Take the dot product of proj against each known projected face. The resulting dot product is called the "score".
[4] The known projected face that receives the highest score, is considered the identity of the test image.

A thorough discussion of the particular algorithms employed may be found in a paper entitled "The CSU Face Identification Evaluation System: Its Purpose, Features, and Structure," which appeared in *International Conference on Vision Systems*, pp. 304-311, in April, 2003.

Once the Eigenfaces $E[e_1, e_2, \ldots, e_n]$ are established, we may always decompose a face into a projection vector over the Eigenspace $v=\langle I,e \rangle$, and $V=[v_1, v_2, \ldots, v_n]$ is the Eigenvector of the face image over the Eigenfaces.

Advantageously, and as can be appreciated by those skilled the art, Eigenfaces are basic elements of original faces and the generated Eigen vectors have invariant properties associated with each face. Consequently, when the generated Eigen vectors are used as keys for watermarks applied to an identification document having the original face, its authenticity may be verified from the watermark itself.

As noted initially with reference to FIG. 1, the present invention performs a facial feature extraction as described above (FIG. 1-B*lock* 110). The facial features so extracted are quantized (Block 120) and a watermark bitstream is generated (Block 130). Finally, to ensure robustness, the bitstream is etched into a low frequency band of the wavelet image (Block 140).

In one implementation of the present invention, uniform quantization is satisfactorily performed using only 8-bits. Those skilled in the art will readily appreciate that it may be improved by optimizing quantization while minimizing quantization error. Normally, increasing information rate(s) (payload) for watermarking will result in more watermark bits being embedded, therefore producing a more robust watermark.

As noted, to ensure robustness, the watermark bit stream is etched into the low frequency band of the wavelet image. The particular method employed in a current implementation is described in a paper entitled "A Blind Content Based Digital Image Signature", authored by G. R. Arce and L. Xie, which appeared in *Proceedings of the 2$^{nd}$ Annual Fedlab Symposium on ATIRP*, February, 1998.

Figure 3:
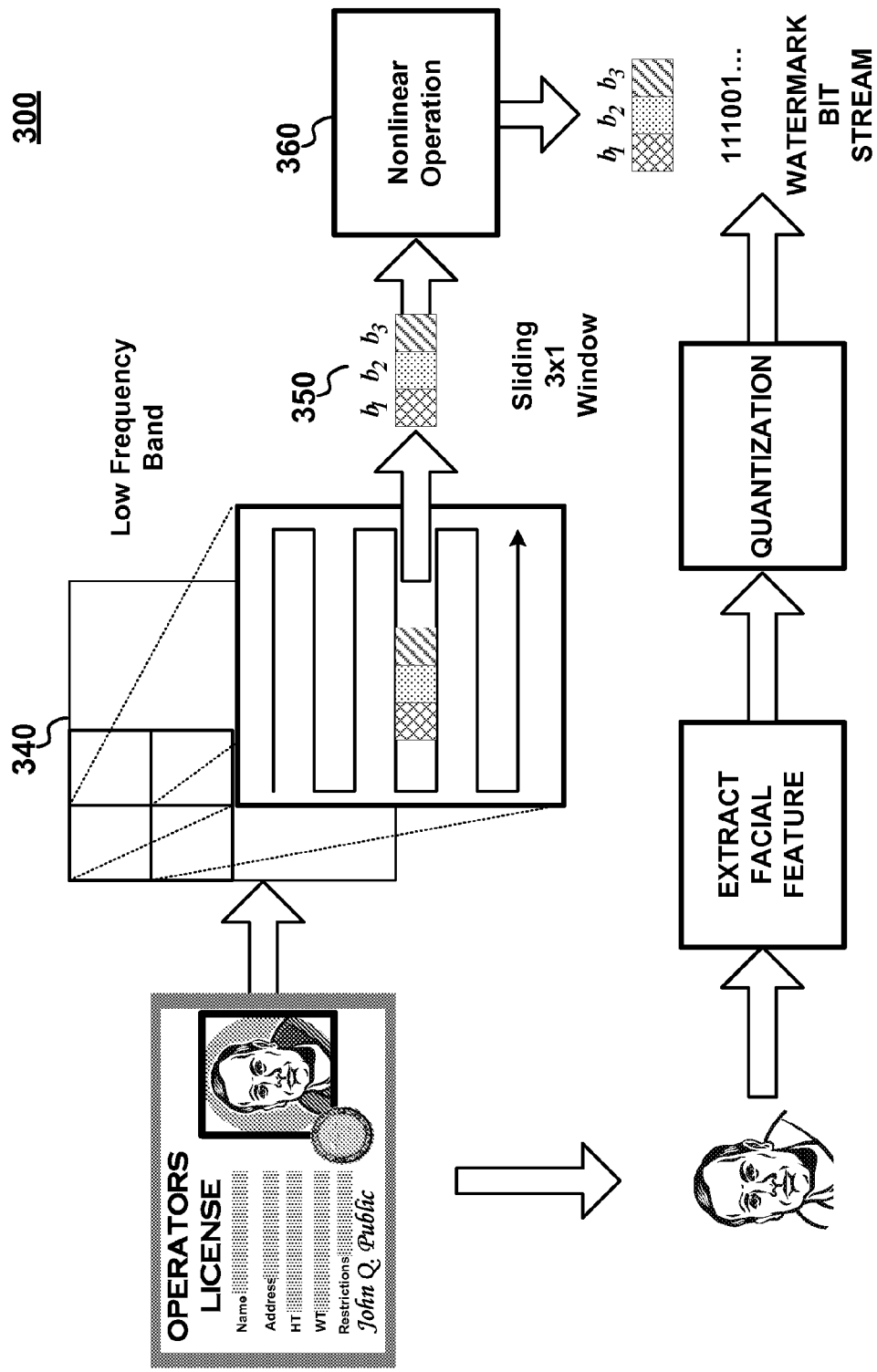
FIG. 3 shows the steps of embedding a watermark into an ID document according to an embodiment of the present invention.
Figure 4:
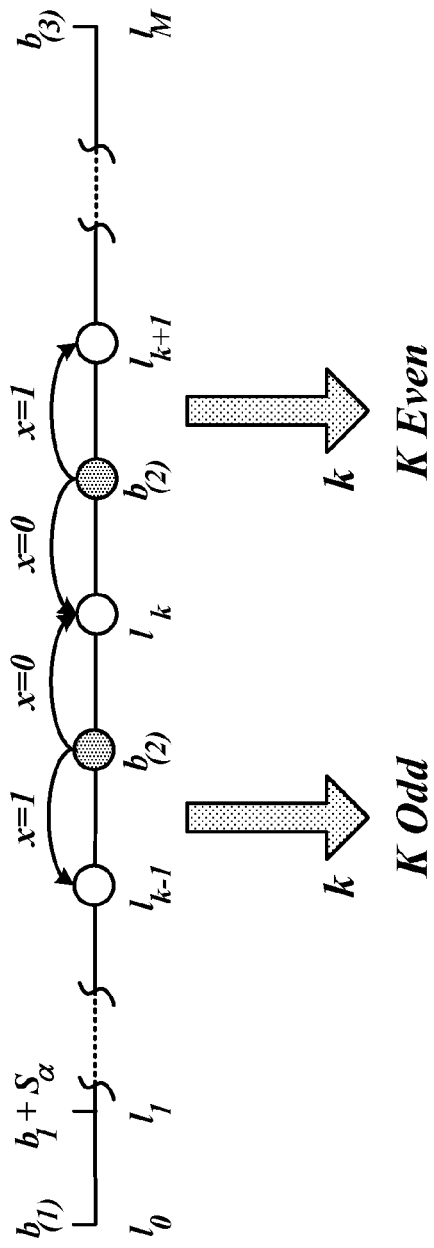
FIG. 4 shows the watermark engraving structure employed in an embodiment of the present invention.

With simultaneous reference now to FIG. 3 and FIG. 4, it can be seen where in the process and how the watermark bit sequence is etched into the low-frequency band of the wavelet image representation 340. A sliding and non-overlapping 3×1 running window 350 is applied through the entire low frequency band of the wavelet decomposed image 340. At each location, a watermark bit is etched. As shown, elements within the window 350 are denoted as $b_1, b_2, b_3$, which are the coefficients' value at locations with coordinates (i−1,j),(i,j), (i+1,j). The corresponding sorted, rank ordered coefficients are denoted as $b_{(1)} \leq b_{(2)} \leq b_{(3)}$.

A nonlinear transformation is performed 360 thereby changing the median of these coefficients while keeping the remaining coefficients the same. The modified median is denoted by $b'_{(2)}$, which is obtained by the transformation:

$$b'_{(2)} = f(\alpha, b_{(1)}, b_{(3)}, x);$$

where x is the watermark bit to be etched.

The rank-order transformation is advantageously able to engrave signature data into a large number of images while preserving their image quality. Basically, the transformation changes the median of a local area to a value set by its neighbors.

Given the coefficients $b_1, b_2, b_3$ and the corresponding order statistics $b_{(1)}, b_{(2)}, b_{(3)}$, the following is defined:

$$S_\alpha = \alpha \frac{|b_{(1)}| + |b_{(3)}|}{2}$$

where α is a tuning parameter with its default value of 0.05. It should be noted that previously it was defined as:

$$S_\alpha = \alpha \frac{b_{(1)} + b_{(3)}}{2}$$

which produces a substantially lower bit rate.

Next, the range of the coefficients ($b_{(1)}, b_{(3)}$) is partitioned into M intervals, each interval having a length $S_\alpha$. The boundary of the partitions are denoted as $l_0, l_1, \ldots l_M$, with $l_0 = b_{(1)}$, $l_1 = b_{(1)} + S_\alpha, \ldots, l_M = b_{(3)}$, with M being the smallest integer for which $MS_\alpha > b_{(3)} - b_{(1)}$. A region is defined in the interval $[l_{k-1}, l_k]$ as $R_k$, then $b_{(2)}$ is transformed into $b'_{(2)}$ as:

$$b'_{(2)} = \begin{cases} l_k & \text{case } A \\ l_{k-1} & \text{case } B \end{cases},$$

where:

case A $\triangleq$ {k is odd and x=1, or k is even and x=0}; and case B $\triangleq$ {k is even and x=1, or k is odd and x=0}.

Where x is the bit of the watermark being inserted in the location in the window.

Figure 5:
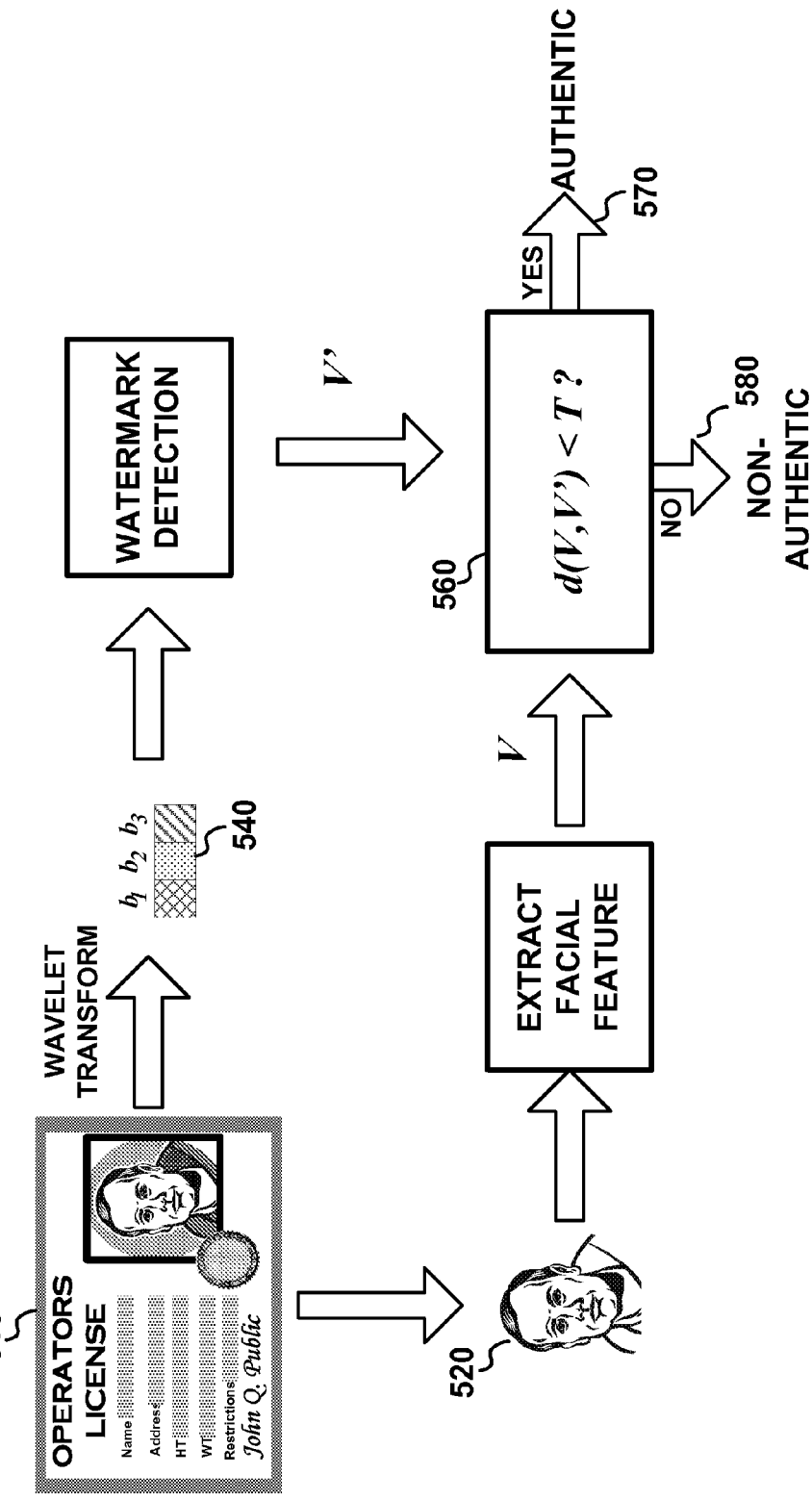
FIG. 5 shows the steps of detecting a watermark and face ID authentication according to an embodiment of the present invention.

Watermark extraction—which takes place at a receiver or detector—is shown in FIG. 5 and it comprises an inverted etching process. A 3×1 window 540 is shifted through a received, wavelet transformed image and a sequence with elements $B_{(1)}, B_{(2)},$ and $B_{(3)}$ is obtained.

A watermark bit associated with the window is extracted as:

$$x = \arg\min_{x \in (0,1)} |B_{(2)} - f(\alpha, b_{(1)}, b_{(3)}, x)|.$$

where x is the possible value of the watermark sample (within 0,1) and $B_{(1)} = b_{(1)}, B_{(3)} = b_{(3)}$.

Advantageously, there is no need for the original image to retrieve the watermark as the invariance of rank ordering is utilized to "memorize" a hidden information bit. Shifting the decoding window throughout the entire watermarked image, the entire embedded watermark sequence V' is obtained.

The received image 520 is used to determine the Eigen vector features V of the facial image on the identification document 510 as described previously. Authentication verification is accomplished by comparing the Eigen vector features V with the message bits carried by the watermark 560. If they fall within a pre-determined threshold, then the document is authentic 570, else it is declared non-authentic 580. Advantageously, the threshold may be chosen to maximize the detection accuracy of this authentication process.

Figure 6:
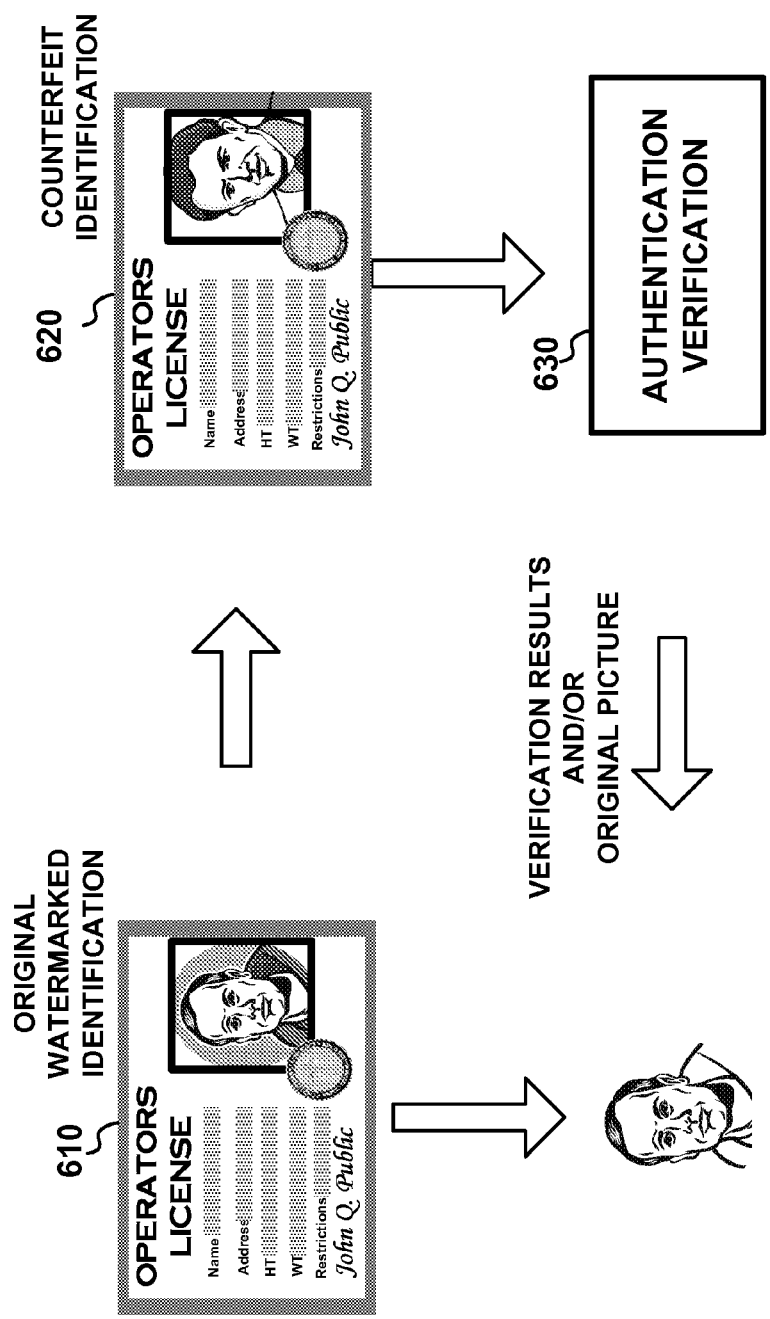
FIG. 6 shows the steps of authentication verification and recovery according to an embodiment of the present invention.

As can now be readily appreciated by those skilled in the art, a preferred method of the present invention provides a mechanism by which an identification document may be automatically verified and authenticated. Such a process is shown schematically in FIG. 6. If an original, authentic identification document 610 is watermarked according to my inventive method, a counterfeit of that document 620 is readily detected. More specifically, if any watermark from the counterfeit is not matched with the intrinsic face image. Eigen vector feature(s), then the counterfeit is detected. Alternatively, the detected watermark may be used to restore the original facial image.

While the present invention has been discussed and described using some specific examples, those skilled in the art will recognize that the teachings are not so limited. More specifically, it is understood that the present invention may be used with a variety of watermarks and or embedding methods in virtually any application requiring verifiable authentication and/or correction. Accordingly, it is understood that the present invention should be only limited by the scope of the claims attached hereto.

What is claimed is:

1. A watermarking method for a picture identification document, said method comprising the steps of:
    extracting facial features from a facial image on the picture identification document;
    generating a watermark key from the extracted facial features wherein said facial features used to generate the watermark key are an Eigenface representation of the facial features and the watermark key generated is an Eigenface vector of the facial features;
    generating a watermark using the watermark key, wherein the watermark key is distinct from the watermark; and
    embedding the watermark on the picture identification document.

2. The method of claim 1 further comprising the steps of: quantizing the extracted facial features.

3. The method of claim 2 further comprising the steps of: generating a watermark bit stream to be embedded.

4. The method of claim 3 further comprising the steps of: embedding the watermark key into a wavelet transformed facial image.

5. The method of claim 4 further comprising the steps of: etching the watermark bit stream into a low-frequency band of the wavelet image.

6. The method according to claim 5 further comprising the steps of:
    applying a sliding and non-overlapping 3×1 running window through the entire low frequency band of the wavelet image; and
    etching a watermark bit at each location of the band.

7. A watermarking method for a picture identification document containing a facial image, said method comprising the steps of:
    generating a watermark to be embedded onto the picture identification document; and
    embedding the watermark onto the picture identification document;
    the method characterized in that;
    the watermark is generated using a secret key which is distinct from the watermark and wherein the secret key for the embedded watermark is determined from facial features obtained from the facial image wherein said facial features used to generate the watermark key are an Eigenface representation of the facial features and the watermark key generated is an Eigenface vector of the facial features.

8. The method of claim 7 further comprising the steps of: retrieving the embedded watermark from the picture identification card.

9. An authenticating method employing digital watermarks for picture identification cards including a facial image, said method comprising the steps of:
    extracting a set of facial features from the facial image;
    extracting a watermark previously applied to the card wherein said watermark was previously generated using a watermark key derived from a set of facial features contained within the facial image and wherein said watermark is distinct from said watermark key wherein said facial features used to generate the watermark key are an Eigenface representation of the facial features and the watermark key generated is an Eigenface vector of the facial features;
    extracting the watermark key and self-authenticating the facial image with the watermark using the extracted watermark key without using a separate secret key; and
    determining, whether the card is authentic by comparing certain characteristic(s) of the watermark with characteristics of the facial features.

10. The method of claim 9 wherein said facial feature extraction employs an Eigen face technique.

11. The method of claim 9 further comprising the steps of: transforming, through the effect of a wavelet transform, the facial image on the card.

12. The method of claim 9 wherein said determining step compares an embedded watermark sequence with Eigen vector features of the facial image.

13. An article of manufacture comprising a picture-identification document (ID) comprising:
    identification indicia;
    a facial image; and
    a digital watermark;
    said picture-identification document produced by a process comprising the steps of:
    extracting one or more facial features from the facial image;
    generating a digital watermark key from the extracted facial feature wherein said facial features used to generate the watermark key are an Eigenface representation of the facial features and the watermark key generated is an Eigenface vector of the facial features;
    generating a watermark using the watermark key, wherein the watermark key is distinct from the watermark; and
    embedding the watermark on the picture-identification document.

14. The picture-identification document of claim 13 wherein said process further comprises the steps of: quantizing the extracted facial features.

15. The picture-identification document of claim 14 wherein said process further comprises the steps of: generating a watermark bit stream to be embedded.

16. The picture-identification document of claim 15 wherein said process further comprises the steps of: embedding the watermark key into a wavelet transformed facial image.

17. The picture-identification document of claim 16 wherein said process further comprises the steps of: etching the watermark bit stream into a low-frequency band of the wavelet image.

18. The picture-identification document according to claim 17 wherein said process further comprises the steps of:
    applying a sliding and non-overlapping 3×1 running window through the entire low frequency band of the wavelet image; and
    etching a watermark bit at each location of the band.

19. A computer readable medium, the contents of which comprises:
    identification indicia;
    a facial image of an individual; and
    a digital watermark;
    said computer readable medium contents generated by a computer-implemented process comprising the steps of:
    extracting one or more facial features from the facial image;
    generating a digital watermark key from the extracted facial features wherein said facial features used to generate the watermark key are an Eigenface representation of the facial features and the watermark key generated is an Eigenface vector of the facial features;
    generating a watermark using the watermark key, wherein the watermark key is distinct from the watermark; and
    embedding the watermark within the contents of the computer readable medium.

20. The computer readable medium contents of claim 19 wherein said process further comprises the steps of:
quantizing the extracted facial features.

21. The computer readable medium contents of claim 20 wherein said process further comprises the steps of:
generating a watermark bit stream to be embedded.

22. The computer readable medium contents of claim 21 wherein said process further comprises the steps of:
embedding the watermark key into a wavelet transformed facial image.

23. The computer readable medium contents of claim 22 wherein said process further comprises the steps of:
etching the watermark bit stream into a low-frequency band of the wavelet image.

24. The computer readable medium contents of claim 23 wherein said process further comprises the steps of:
applying a sliding and non-overlapping 3×1 running window through the entire low frequency band of the wavelet image; and
etching a watermark bit at each location of the band.

* * * * *